United States Patent
Wilcox et al.

(10) Patent No.: US 10,038,783 B2
(45) Date of Patent: Jul. 31, 2018

(54) SYSTEM AND METHOD FOR HANDLING INTERACTIONS WITH INDIVIDUALS WITH PHYSICAL IMPAIRMENTS

(71) Applicant: Genesys Telecommunications Laboratories, Inc., Daly City, CA (US)

(72) Inventors: Brian Wilcox, Washington, DC (US); Colin Michael Leonard, Raleigh, NC (US); Herbert Willi Artur Ristock, Walnut Creek, CA (US)

( * ) Notice: Subject to any disclaimer, the term of this patent is extended or adjusted under 35 U.S.C. 154(b) by 0 days.

(21) Appl. No.: 15/253,784

(22) Filed: Aug. 31, 2016

(65) Prior Publication Data

US 2018/0063325 A1 Mar. 1, 2018

(51) Int. Cl.
| H04M 11/00 | (2006.01) |
| H04M 3/00 | (2006.01) |
| H04M 3/42 | (2006.01) |
| G09B 21/00 | (2006.01) |
| H04M 3/51 | (2006.01) |
| H04M 3/523 | (2006.01) |

(52) U.S. Cl.
CPC ...... *H04M 3/42391* (2013.01); *G09B 21/001* (2013.01); *G09B 21/009* (2013.01); *H04M 3/5183* (2013.01); *H04M 3/5233* (2013.01)

(58) Field of Classification Search
USPC .................... 379/52, 265.01, 265.09, 265.12
See application file for complete search history.

(56) References Cited

U.S. PATENT DOCUMENTS

| 5,559,855 | A | 9/1996 | Dowens |
| 6,683,937 | B1 | 1/2004 | Watson |
| 7,899,177 | B1 * | 3/2011 | Bruening ......... H04M 3/42068 |
| | | | 379/265.01 |
| 8,995,644 | B2 | 3/2015 | Ristock et al. |
| 2005/0238143 | A1 | 10/2005 | Clapp et al. |
| 2009/0003578 | A1 * | 1/2009 | Jain ..................... G09B 21/00 |
| | | | 379/211.01 |

(Continued)

OTHER PUBLICATIONS

Jake Araullo, et al., *The Leap Motion Controller: a View on Sign Language*, 4 pages, Nov. 2013, https://www.researchgate.net/publication/262172749.

(Continued)

*Primary Examiner* — Quoc D Tran

(57) ABSTRACT

A method for handling an interaction between an individual having a physical impairment and a customer contact center includes: detecting, by a processor, an interaction directed to a route point; determining, by the processor, whether the interaction is associated with an individual having a physical impairment; identifying, by the processor, a first resource of the contact center for handling the interaction, wherein the first resource is assigned an attribute indicative of being suitable for handling interactions with individuals having the physical impairment; ascertaining, by the processor, a presence of the first resource at a place enabled for handling interactions with individuals having the physical impairment; and transmitting, by the processor, a signal for routing the interaction to the first resource for servicing via the place, wherein in response to the signal, a communication session is established with a user device of the individual having the physical impairment.

20 Claims, 7 Drawing Sheets

(56) References Cited

U.S. PATENT DOCUMENTS

| | | | |
|---|---|---|---|
| 2014/0270144 A1* | 9/2014 | Bentley | H04M 3/5116 |
| | | | 379/265.12 |
| 2014/0334614 A1 | 11/2014 | Mezhibovsky et al. | |
| 2015/0181040 A1 | 6/2015 | Ristock et al. | |
| 2016/0036972 A1 | 2/2016 | Ristock et al. | |
| 2016/0366370 A1* | 12/2016 | Hamling | H04N 7/147 |

OTHER PUBLICATIONS

Athima Chansanchai, *Sign Language Translator Uses Kinect as a Bridge Between the Deaf and Hearing*, 7 pages, Oct. 30. 2013, https://blogs.microsoft.com/next/2013/10/30/sign-language-translator-uses-kinect-as-a-bridge-between-the-deaf-and-hearing/#sm.0001w058bv17zkcplrglm1qz . . . .

Stemper, J., MotionSavvy UNI: 1st Sign Language to Voice System, Nov. 2012, 10 pages, https://www.indiegogo.com/projects,motionsavvy-uni-1st-sign-language-to-voice-sysem#/.

International Search Report and Written Opinion for Application No. PCT/US2017/048732, dated Nov. 24, 2017, 13 pages.

\* cited by examiner

SYSTEM AND METHOD FOR HANDLING INTERACTIONS WITH INDIVIDUALS WITH PHYSICAL IMPAIRMENTS

FIELD

Aspects of embodiments of the present invention relate to a system and method for handling interactions with individuals having physical impairments.

BACKGROUND

Current methods of accessing customer service support present a number of difficulties and inconveniences for customers with impairments or disabilities. Some companies fail to provide any accommodations for individuals with disabilities, thereby alienating an entire group of potential customers. Other companies provide minimal accommodations for customers with disabilities, such as dedicated support specialists and special dial-in numbers, but such resources may be difficult to locate or may have only limited availability. The inconvenience and ineffectiveness of these support options can lead to frustration and low levels of satisfaction among customers with impairments or disabilities.

SUMMARY

Aspects of some embodiments of the present invention relate to a system and method for handling interactions that automatically identifies appropriate resources and media channels for servicing interactions with users (or customers) who have impairments or disabilities (e.g., impaired speech, impaired vision, impaired hearing, impaired mobility or other physical disability). By dynamically orchestrating a user experience that spans multiple media channels, a system and method for handling interactions according to an embodiment can adapt to meet the unique needs of a user with a physical impairment.

According to an aspect of some embodiments, a system and method for handling interactions with individuals having physical impairments can provide streamlined customer service support that is more readily accessible and usable by individuals with disabilities via existing user interfaces.

According to an embodiment, a method for handling an interaction between an individual having a physical impairment and a customer contact center, includes: detecting, by a processor, an interaction directed to a route point; determining, by the processor, whether the interaction is associated with an individual having a physical impairment; identifying, by the processor, a first resource of the contact center for handling the interaction, and the first resource is assigned an attribute indicative of being suitable for handling interactions with individuals having the physical impairment; ascertaining, by the processor, a presence of the first resource at a place enabled for handling interactions with individuals having the physical impairment; and transmitting, by the processor, a signal for routing the interaction to the first resource for servicing via the place, and in response to the signal, a communication session is established with a user device of the individual having the physical impairment.

The route point may be associated with a call number, and the call number may not be a dedicated number for interactions with hearing or speech impaired individuals.

Determining whether the interaction is associated with an individual having the physical impairment may be based on data transmitted by the user device of the individual having the physical impairment.

Determining whether the interaction is associated with an individual having the physical impairment may be based on a response to a prompt provided by an interactive media response server coupled to the processor.

Determining whether the interaction is associated with an individual having the physical impairment may be based on a user attribute stored in a mass storage device coupled to the processor.

The first resource may be an agent of the contact center, and the attribute may be stored as an agent skill.

The place may be enabled to handle interactions via a plurality of media channels bundled as a virtual media channel.

The plurality of media channels may be preset prior to the interaction.

The plurality of media channels may be dynamically aggregated and associated with the place, in response to detecting the interaction, and based on at least one of a profile of the individual having the physical impairment or capabilities of the user device.

The method may further include: selecting, by the processor, a second resource based on determining that the first resource is not present at the place, and the second resource is not assigned the attribute indicative of being suitable for handling interactions with individuals having the physical impairment; transmitting, by the processor, a signal for routing the interaction to the second resource, and in response to the signal, a communication session is established with the user device of the individual having the physical impairment; monitoring availability of the first resource during the communication session; and in response to determining availability of the first resource during the communication session, transmitting a signal for transferring the communication session to a device of the first resource.

The physical impairment may be at least one of impaired speech, impaired hearing, impaired mobility, or impaired vision.

According to another embodiment, a system for handling an interaction between an individual having a physical impairment and a customer contact center includes: a processor; and a memory, and the memory stores instructions that, when executed by the processor, cause the processor to: detect an interaction directed to a route point; determine whether the interaction is associated with an individual having a physical impairment; identify a first resource of the contact center for handling the interaction, and the first resource is assigned an attribute indicative of being suitable for handling interactions with individuals having the physical impairment; ascertain a presence of the first resource at a place enabled for handling interactions with individuals having the physical impairment; and transmit a signal for routing the interaction to the first resource for servicing via the place, and in response to the signal, a communication session is established with a user device of the individual having the physical impairment.

The route point may be associated with a call number, and the call number may not be a dedicated number for interactions with hearing or speech impaired individuals.

The instructions that cause the processor to determine whether the interaction is associated with an individual having the physical impairment may include instructions for making the determination based on data transmitted by the user device of the individual having the physical impairment.

The instructions that cause the processor to determine whether the interaction is associated with an individual having the physical impairment may include instructions for making the determination based on a response to a prompt provided by an interactive media response server coupled to the processor.

The instructions that cause the processor to determine whether the interaction is associated with an individual having the physical impairment may include instructions for making the determination based on a user attribute stored in a mass storage device coupled to the processor.

The first resource may be an agent of the contact center, and the attribute may be stored as an agent skill.

The place may be enabled to handle interactions via a plurality of media channels bundled as a virtual media channel.

The plurality of media channels may be preset prior to the interaction.

The plurality of media channels may be dynamically aggregated and associated with the place, in response to detecting the interaction, and based on at least one of a profile of the individual having the physical impairment or capabilities of the user device.

The instructions, when executed, may further cause the processor to: select a second resource based on determining that the first resource is not present at the place, and the second resource is not assigned the attribute indicative of being suitable for handling interactions with individuals having the physical impairment; transmit a signal for routing the interaction to the second resource, and in response to the signal, a communication session is established with the user device of the individual having the physical impairment; monitor availability of the first resource during the communication session; and in response to determining availability of the first resource during the communication session, transmit a signal for transferring the communication session to a device of the first resource.

The physical impairment may be at least one of impaired speech, impaired hearing, impaired mobility, or impaired vision.

DETAILED DESCRIPTION

It is desirable for a contact center to provide individuals with impairments or disabilities with quick, convenient access to various communication channels for obtaining customer service assistance. For instance, hearing impaired individuals (HI's) can communicate by speaking, listening to what they can hear, and/or reading what the other person is saying through text displayed on a captioned telephone device. Both HIIs and speech impaired individuals can use teletypewriter (TTY) devices to receive audio communications and enter text in response. HIIs and speech impaired individuals can also utilize video conferencing to communicate in sign language, or utilize a web-enabled device to communicate via online chat.

Figure 1:
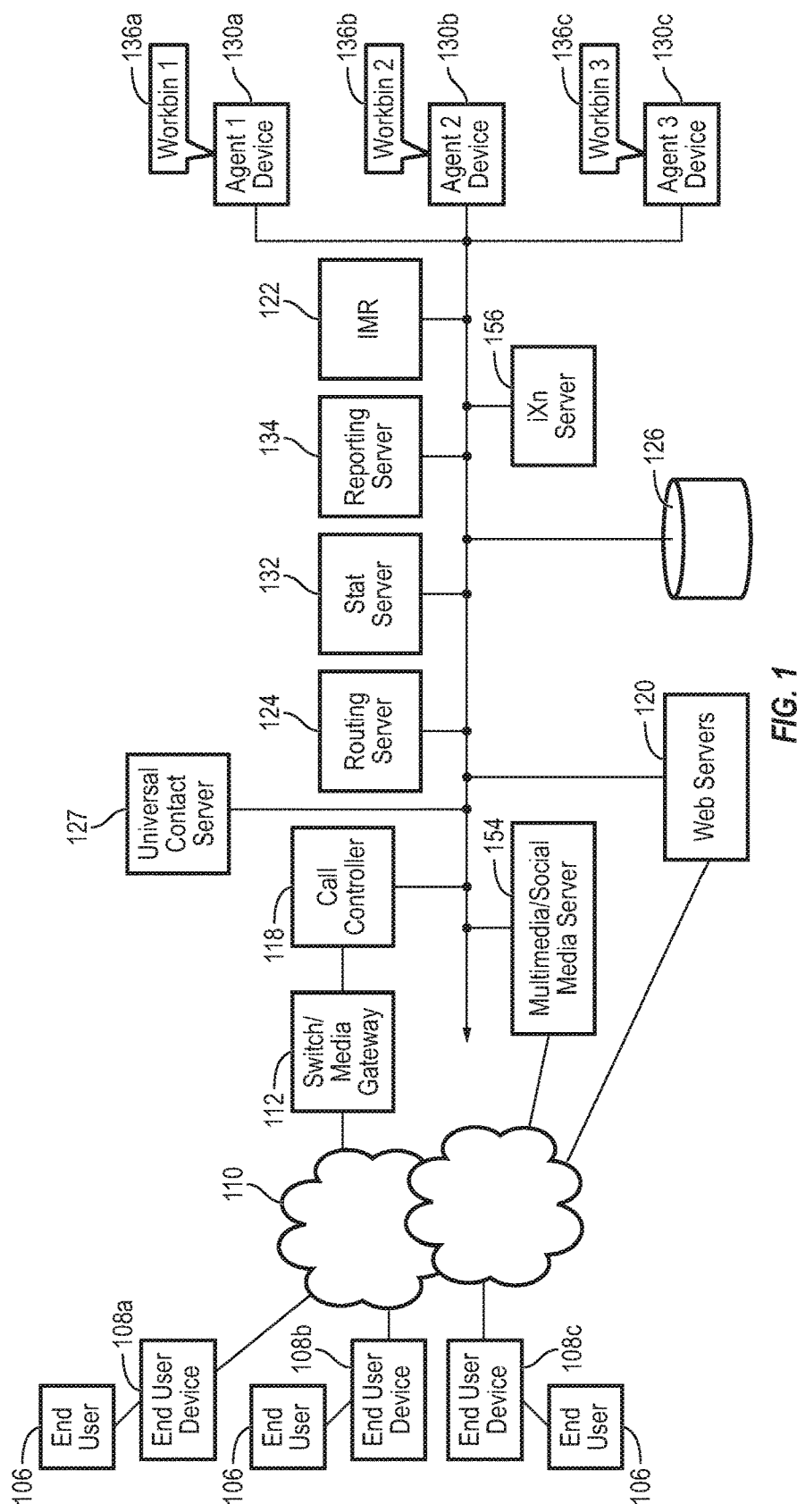
FIG. 1 is a schematic block diagram of a system for supporting a contact center in providing contact center services, according to an embodiment of the present invention.

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premises and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. personnel, computers, and telecommunication equipment), including specialized software and media resources such as interactive media response (IMR) applications, to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users 106) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging (e.g., SMS), web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server 124 (also referred to as an orchestration server) to find an appropriate agent for processing the interaction. The selection of an appropriate agent for routing an inbound interaction may be based, for example, on a routing strategy employed by the routing server 124, and may further be based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by the contact center to resolve any customer issues, and information about attributes of existing clients, such as impairments, disabilities, device capabilities, language proficiencies, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may also include a telephone adapted for regular telephone calls, VoIP calls, and the like. The agent device 130 may also include a computer for communicating with one or more servers of the contact center and for performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The interaction server 156 may bundle/unbundle media channels as instructed by the routing/orchestration server 124, and may preserve or deconstruct a bundle of media channels, e.g., in the case of transfer or conferencing. The work split between the interaction server 156 and the SIP server in the call controller 118 is the set of media channels. For instance, the interaction server 156 may deal with digital media, and the SIP server may deal with voice as well as video and chat. Both the SIP server and the interaction server 156 may maintain route points where interactions are queued for processing. The interaction server 156 may also manage workbins that can be used for deferred interactions.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences (e.g., communication channel preferences) and interaction history, and to capture and store data regarding comments from agents, customer communication history, and the like. The UCS 127 may also be configured to store recorded interactions (e.g., audio recordings, video recordings, transcripts, screen captures, and the like).

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like). The reporting server 134 may also interact with the statistics server 132 to process interactions for assessment purposes.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, co-browsing or screen-sharing, text messages, social media messages, web real-time communication (e.g. WebRTC calls), and the like.

Interactions between customers and the contact center can be handled by various contact center services via a number of different media channels. In the case of an interaction associated with a customer who has a particular physical impairment, the routing server 124 may identify a resource (e.g., a first resource) of the contact center to handle the interaction. According to an embodiment, the routing server 124 identifies a resource that is assigned (or tagged with) an attribute indicative of being suitable for handling interactions with individuals having the particular physical impairment. The attribute may relate, for example, to agent skills that are appropriate for the physical impairment. For instance, an agent with sign language knowledge as a skill may be assigned an HII attribute. Resources act as endpoints for servicing interactions and may include, but are not limited to, agents, voice treatments, IVR, IMR, and auto-response email.

The resources may be present at a "place" that is equipped to support a particular media channel or a plurality of media channels aggregated (or bundled) as a virtual media channel. The virtual media channel may be assigned (or tagged with) an attribute indicative of being suitable for handling interactions with individuals having the particular physical impairment. The attribute may relate, for example, to the functionality of devices associated with (or located in) the place that are suitable for servicing the interaction. For instance, a place that is equipped with a webcam for video chat may be assigned an HII attribute.

Figure 2:
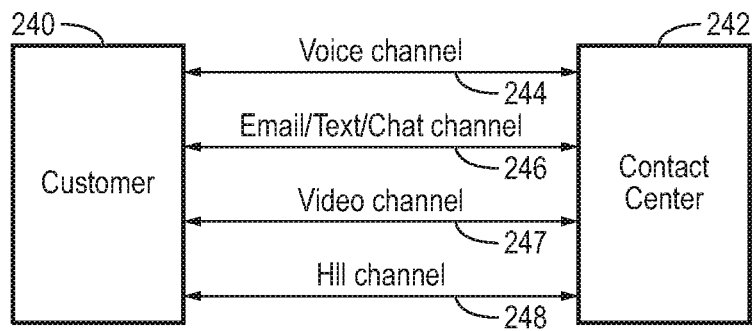
FIG. 2 is a schematic diagram of various media channels for communication between a customer and a contact center, according to an embodiment of the present invention.

FIG. 2 is a schematic diagram of various media channels for communication between a customer and a contact center, according to an embodiment of the present invention. For example, an interaction between a customer 240 and the contact center 242 may be serviced (or handled) via a voice channel 244, an email/text/chat channel 246, a video channel 247, or an HII channel 248.

The channels over which the customer and contact center communicate may be symmetrical (i.e., using the same channel type) or asymmetrical (i.e., using different channel types) in a directional sense. In an asymmetrical communication session, a customer may interact by sending a communication via one channel (e.g., the video channel), and the agent may respond via another channel (e.g., the chat channel). However, both channels are active at both sides. A communication session may be established between the contact center 242 and a customer 240 who is utilizing a plurality of user devices in conjunction with one another.

In one embodiment, the HII channel 248 is a virtual media channel that represents a preset bundle of media channels that are bundled together prior to the interaction. The routing server 124 may employ various rules to aggregate a plurality of media channels as a virtual media channel. For example, a rule might specify that the video channel, the email channel, and the chat channel are to be bundled in a virtual media channel that is to be assigned the "HII" attribute.

In another embodiment, the plurality of media channels may be dynamically aggregated to form the HII channel 248, in response to detecting the interaction.

For example, the plurality of media channels may be aggregated based on a profile of the particular individual with the physical impairment. The routing server 124 may also aggregate a plurality of media channels based on data it retrieves from the mass storage device 126 or the UCS 127. For example, the data may indicate that the individual has a hearing impairment and knows sign language, that the user prefers online chat, and that the user has responded to email notifications in the past. Based on this information, the routing server 124 may bundle the video channel, the chat channel, and the email channel together and may associate the bundled channels with a place. Rules may specify certain types of user data to be considered by the routing server 124 in bundling multiple media channels together as a virtual media channel.

Media channels may also be aggregated based on capabilities of the user device of the individual. For example, the routing server 124 may detect certain functionality of the user's device, such as an enabled TTY mode, which indicates that the user is an HII and which triggers a need for bundling a plurality of channels assigned with the HII attribute. Other device functionality information that the routing server 124 may utilize to determine which media channels to aggregate include, but are not limited to: access to a web browser, presence (or absence) of video call capability, and ability to send and receive text messages.

The HII channel 248 may be selected in the same manner as any other channel. When the HII channel 248 is selected, the routing server 124 can automatically negotiate connections for the underlying media channels that are bundled within the HII channel 248.

Various contact center services and media channels may serve as building blocks for the HII channel 248. For example, a phone call could be handled via the voice channel (or audio channel) 244 by a voice response self-service (e.g., IVR). Or, instead of initiation of self service via the voice channel 244, a visual alternative could be offered to the user via the email/text/chat channel 246. For instance, a web-based visual IVR system that corresponds to a voice application could be utilized and menu options could be presented as a workflow on web pages. As mentioned above, the building blocks could be assembled as a preset "HII media channel" or could be dynamically bundled (or aggregated) to form the HII channel 248. Within a virtual media channel, individual channels could be utilized concurrently (e.g., simultaneously) or serially. For example, a chat widget could be utilized concurrently with a video call.

Using the HII media channel, the contact center can provide assisted service via voice, email/text/chat, co-browse, and video call channels, or a combination thereof. For example, an interaction involving a customer with a hearing impairment and a mobility impairment may be serviced via a virtual media channel that combines video, chat/instant message (IM), and co-browsing. The video channel allows an agent who knows sign language to communicate with the customer and the chat/IM channel allows information that is difficult to sign, such as Internet links, to be sent to the customer. The co-browsing channel allows the agent to help the customer navigate difficult-to-manage clicks on websites.

Additional functions, such as callback functionality and post-interaction surveys, may also be provided via the HII media channel 248. With sufficient user device support, any or all of these media channels could be coordinated and concurrently (e.g., simultaneously) or serially utilized to enhance an impaired user's experience.

According to an embodiment, to provide a sufficient number of suitable channels for communication with the customer, a virtual media channel is designed to include (or bundle) at least two of: an audio (or voice) channel, a video channel, a chat channel, a text message channel, an email channel, a vmail channel, and a co-browse channel. The co-browse channel may be used in combination with other channels.

In one embodiment, the routing server 124 may rank the sub-channels (or constituent channels) within a virtual media channel, based on user preferences, user device information, interaction history, and channel analytics provided by, for example, the UCS 127, the mass storage device 126, and the reporting server 122. As one example, for a user who is an HII, rules may dictate that the video channel receive a higher ranking than the chat channel because analytics reports indicate a higher degree of satisfaction among HII users serviced via the video channel in comparison with the chat channel. As another example, a user with knowledge of sign language may prefer to use the chat channel when communicating via a mobile device such as a smart phone, because it is easier for her to type than to sign with one hand while holding the phone in the other. In such a case, the routing server 124 may detect, based on the user's profile, that the user is an HII with knowledge of sign language and that the device is a handheld mobile device, and the chat channel would receive a higher ranking than the video channel.

Figure 3A:
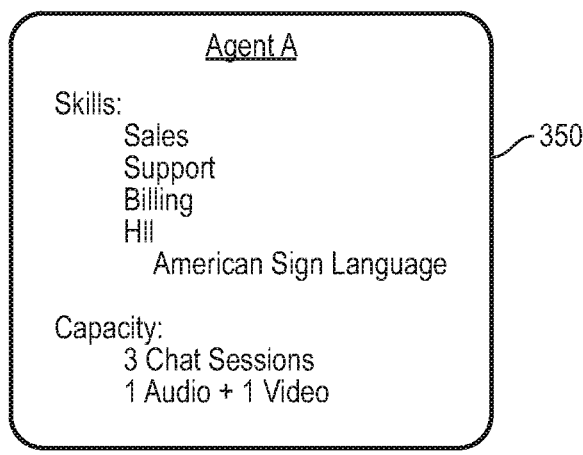
FIG. 3A is a diagram of an exemplary agent profile according to an embodiment of the present invention.

FIG. 3A is a diagram of an exemplary agent profile according to an embodiment of the present invention. In the example of FIG. 3A, the agent profile 350 stores information about skills and capacity of the agent, Agent A. Skills that are tagged to the agent include Sales, Support, Billing, and HII skills. The HII skills may describe a one or more skills that enable Agent A to provide assisted service to HII users, skills such as knowledge of American Sign Language. The capacity information describes the agent's ability to service several interactions and communicate with customers via several different media channels. For example, Agent A may have the capacity to service three chat sessions with different customers, or to service a single communication session via both the audio and video channels. In one embodiment, media channels may also be processed as skills. For example, an agent may have a skill to support the chat channel. The agent profile 350 may be stored, for example, in the mass storage device 126 of FIG. 1.

Although in FIG. 3A Agent A is shown as possessing the HII skill, embodiments of the present invention are not limited thereto. For example, a contact center resource may have a "visually impaired individual" skill. Such a resource could be an agent who knows how to modify a user's device interface (e.g., by adapting the color scheme or size of display elements), or switch the user to a special interface for visually impaired individuals.

Figure 3B:
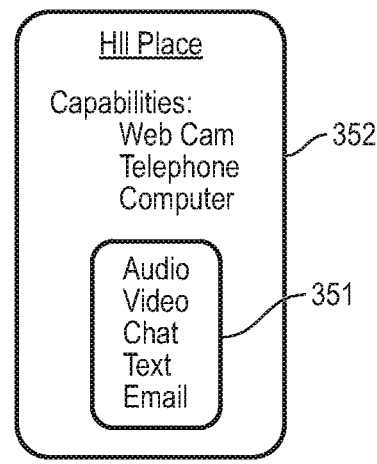
FIG. 3B is a diagram of an exemplary place profile according to an embodiment of the present invention.

FIG. 3B is a diagram of an exemplary place profile according to an embodiment of the present invention. According to an aspect of some embodiments of the present invention, a "place" refers to a workplace (e.g., work station) or device setup of a contact center resource, which has equipment whose functionality is suitable for assisting individuals with particular impairments. The place profile contains information about the capabilities of the equipment in the place. Capabilities may be described in terms of specific types of equipment and/or in terms of the media channels over which the equipment is capable of communicating. In one embodiment, after the routing server 124 identifies an agent with the appropriate skill(s) and capacity for servicing an interaction, the routing server 124 interacts with the statistics server 132 to obtain presence and availability information for determining whether the agent is present at a place that is assigned with an appropriate attribute. The presence information may relate to the agent's current presence or predicted future presence (e.g., based on the agent's schedule). The place profile may also include physical characteristics of the place's location, such as whether the place is located in an enclosed or private space that will enable the agent to provide assisted support without disturbing or distracting other agents (e.g., by speaking more loudly or by signing in sign language). The place profile may be stored, for example, in the mass storage device 126 of FIG. 1.

In the example of FIG. 3B, the place is an HII place (i.e., is assigned with the HI attribute) that includes equipment such as a webcam, a telephone, and a computer, whose functionality is suitable for assisting HI's. The place profile 352 also includes information about a virtual media channel, the HII channel 351. In the example of FIG. 3B, the HII channel 351 includes the audio, video, chat, text, and email channels bundled together. However, embodiments of the present invention are not limited thereto. In one embodiment, the HII place profile includes at least the video, audio, and text channels bundled together.

Figure 4A:
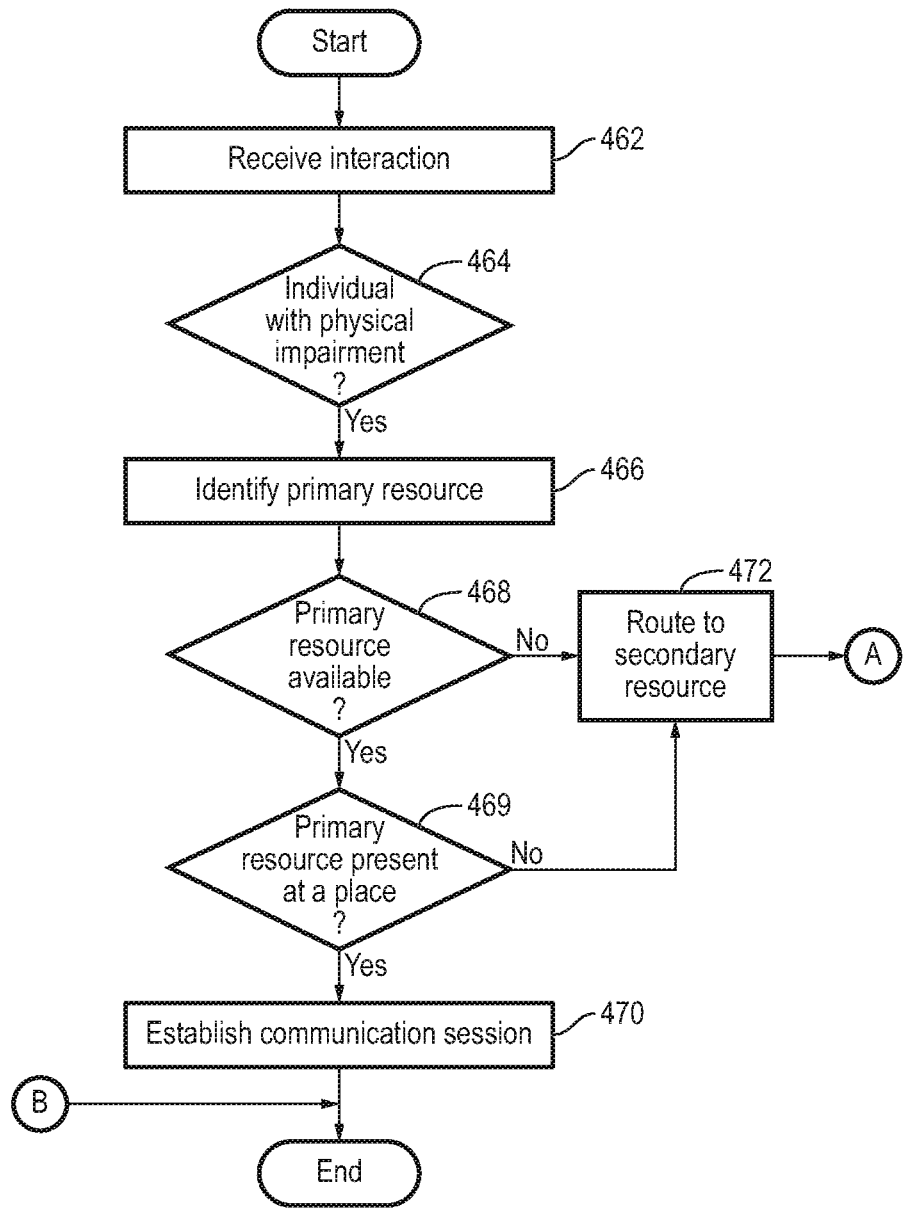
FIGS. 4A-4B are flow diagrams of a method for handling an interaction between an individual having a physical impairment and a contact center, according to an embodiment of the present invention.
Figure 4B:
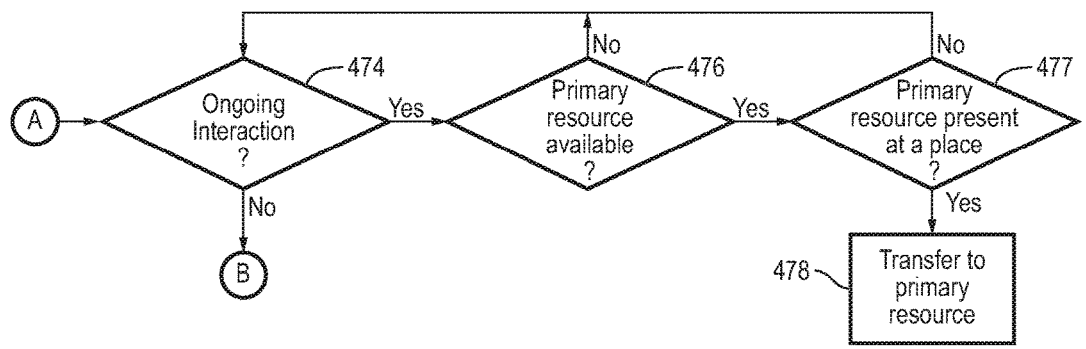

FIGS. 4A-4B are flow diagrams of a method for handling an interaction between an individual having a physical impairment and a contact center, according to an embodiment of the present invention.

At operation 462, the contact center receives an interaction directed to a route point, and detects the interaction. In one embodiment, the call number is a number reserved for callers with physical impairments. For example, referring to FIG. 1, the switch 112 may receive the call via a direct inward dialing (DID) service, and the call may have a DID number. The switch 112 may analyze a dialed number identification service (DNIS) associated with the DID number to play the appropriate recorded message to the caller. For example, where the call number is reserved for HII callers, the recorded message may be an audio file that includes embedded teletype (TTY) tones.

In another embodiment, the route point is associated with a call number that is not a dedicated number for callers with physical impairments. Upon detecting the interaction, the contact center may automatically provide the customer (e.g., end user 106) with a menu of options. In one example, if the customer initiated the interaction via an audio/voice channel, the IMR server 122 may trigger a voice application to play a menu of options. According to one embodiment, each menu option is associated with an audio file that includes TTY tones. The embedded TTY tones may allow the customer's device (e.g., end user device 108a) to display the audio content as text in the event that the user is using a TTY enabled device. In one embodiment, the contact center may tell a customer, via the IMR script, to "press # for TTY menu," and the corresponding message would be displayed as text on the customer's device. If the customer is an HII, he will be able to read the menu options displayed as text on his device.

In another example, if a customer initiated the interaction via a non-audio (e.g., visual), web-based channel, the IMR server 122 may present the menu options to the customer as a workflow on web pages displayed on the customer's device. The IMR server 122 may also invoke a web-based visual IVR system that corresponds to a voice application. An example of a visual IVR system is described in U.S. patent application Ser. No. 14/341,572, filed on Jul. 25, 2014 and entitled "Voice Response Processing," the entire content of which is incorporated herein by reference.

In one embodiment, a voice application may have text-to-speech (TTS) functionality. If the customer is a visually impaired individual, he may hear the menu options being read out loud from his user device.

According to an aspect of some embodiments of the present invention, a customer with a physical impairment can engage in an interaction with a contact center using existing customer service interfaces, and can automatically be presented with a variety of options (e.g., media channels) for receiving customer service.

The customer may respond to the menu options by selecting keys to trigger dual tone multi frequency (DTMF) tones. A visually impaired individual may respond by speaking responses which are recognized and processed by the IMR server 122.

According to an aspect of some embodiments of the present invention, a contact center can provide appropriate assisted service scenarios for customers with physical impairments, based on differentiation triggers. Differentiation may include attaching a call associated data (attached data) key to a media request (e.g., when the customer selects a digit from a media response unit that indicates a need for HII assistance); filtering out resources that are not assigned with appropriate skills; and routing the interaction to a resource that is present at a "place" equipped with devices suitable for communicating with the customer. In the case of call associated data, these data may be created and updated by various entities involved in interaction processing. For example, referring to FIG. 1, basic data may be created by the SIP server in the call controller 118, or the interaction server 156, and can be extended or updated by the IMR server 122, routing/orchestration server 124, or by explicit agent request. The data travels with the interaction, and can be queried, for example, by another router for deciding what to do next with the interaction. For instance, the data may be queried following an IMR conversation where user feedback is captured in attached data.

At operation 464 in FIG. 4A, the call controller 118 determines whether the interaction is associated with an individual having a physical impairment, and may also identify the type of impairment. The determination may be made based on information provided by the customer, such as the end user's response to a prompt provided by an IMR server as described above. For example, the customer may press the # key to select the TTY menu, and the call controller 118 detects that the user is hearing impaired based on the selection. The UCS 127 and the customer database stored in the mass storage device 126 may store information about the end user's selection in response to the IMR script, e.g., for future automated identification.

In some embodiments, the call controller 118 may make the determination automatically, such as based on data transmitted by the device of the individual having the physical impairment. For example, in one embodiment, the customer may have a mobile application installed on his device, which is specific to a particular impairment or disability. Such mobile applications may be designed to, for example, translate unclear speech of individuals with speech impediments, connect individuals with visual impairments to an operator or assistant who has sight, or who can amplify sounds for HI's. The call controller 118 may receive data from the user device that allows the call controller 118 to detect and identify a particular impairment of the customer, based on the nature of the mobile application installed on the device.

In one embodiment, the user device may be a medical device that is specifically designed for a particular impairment or disability, such as a cochlear implant or an ophthalmic device. The medical device may transmit data over a communication network, and may interface with the Internet of Things, which has protocols defined for various purposes. For example, some protocols for data transfer include Message Queuing Telemetry Transport (MQTT), Constrained Application Protocol (CoAP), and Advanced Message Queuing Protocol (AMQP). In the healthcare context, protocols such as ZigBee and Bluetooth may be utilized between medical devices and application hosting devices (e.g., smartphones or computers), and protocols such as Health Level-7 (HL7) may be utilized between applications and central servers. If the medical device is worn by the customer while contacting the customer center, or the same smartphone device is utilized for communication with the contact center, the general impairment status could be exposed, for example, by an HL7 query or through accessible metadata of the mobile application (e.g., a health-related application) installed on the smartphone.

The call controller 118 may also detect a device capability of the user device based on information received from the customer or from the user device itself. The UCS 127 and the customer database stored in the mass storage device 126 may store information about the detected device capability.

In some embodiments, the call controller 118 may also determine whether the interaction is associated with an individual having a physical impairment, based on a user's saved profile stored in the mass storage device 126.

In one embodiment, operation 464 may optionally include a validation step to verify that the caller has a physical impairment and is not, for example, a non-impaired person simply utilizing the impaired individual's device. Such a validation step could be performed after the routing server 124 automatically detects that the caller has a physical impairment as described above. In one embodiment, the validation step includes transmitting a prompt to the caller that asks the caller to confirm his or her particular impairment. The prompt is transmitted via a media channel assigned with an attribute that corresponds to the impairment. For instance, the routing server 124 may automatically detect that the customer is an HII based on a mobile application installed on the customer's device, and may subsequently transmit an audio file embedded with TTY tones that states, "Please press 1 to confirm that you would like to utilize our enhanced customer service experience for hearing impaired users."

After determining that an interaction is associated with an individual having a physical impairment, the routing server 124 performs a routing check to identify an appropriate resource to whom the interaction should be routed, and an appropriate destination (e.g., a place) to which the interaction should be routed.

At operation 466, the routing server 124 identifies a primary resource (or first or preferred resource) of the contact center for handling the interaction. The primary resource may be a resource that is assigned (or tagged with) an attribute indicative of being suitable for handling interactions with individuals having a particular physical impairment. For example, the routing server may identify as a primary resource an agent whose profile contains an HII skill. In one embodiment, the routing server 124 may identify a plurality of resources assigned with the attribute as the primary resource. According to an aspect of some embodiments of the present invention, by considering only those resources who are assigned with appropriate attributes, the routing server 124 effectively filters out resources that do not have the appropriate skills to provide the customer with assisted service.

At operation 468, the routing server 124 may interact with the statistics server 132 to determine availability of the primary resource. In one embodiment, the routing server 124 determines availability of the primary resource by reviewing a schedule of the resource and determining whether the primary resource is engaged in another interaction. In one embodiment, the routing server 124 determines availability of the resource by considering a predicted availability relative to a threshold wait time (e.g., whether an agent with the HII skill is available within the next five minutes).

At operation 469, if the routing server 124 determines that the primary resource is available, the routing server checks whether the primary resource is also present at a place that is equipped with devices enabled for assisting the impaired customer. In one embodiment, the routing server 124 may obtain presence information of an agent from the statistics server 132. According to one embodiment, the presence information indicates the agent's presence relative to one or more devices (e.g., mobile device, computer, etc.) and/or one or more media channels (e.g., access to video chat, text message, etc.) that are suitable for servicing interactions with customers having particular physical impairments.

At operation 470, if the primary resource is both available and present at an appropriate place, the routing server 124 transmits a signal for routing the interaction to the primary resource at the place. In one embodiment, the routing server 124 selects the HII channel for servicing the interaction, if all of the channels bundled in the HII channel are supported by the customer's device. In this regard, the customer's device may announce its media capabilities using, for example, the Session Description Protocol (SDP) which is well known in the art. A separate presence server (not shown) may also be invoked for determining the customer's presence on different communication mediums as is described in further detail in U.S. Pat. No. 8,995,644, the content of which is incorporated herein by reference.

If less than all of the channels in the HII channel are supported by the customer's device, the routing server 124 may select a non-HII channel or may dynamically identify a set of supported media channels as a new HII channel.

A communication session is established between a device of the primary resource and the user device of the individual having the physical impairment, in response to the routing signal. The communication session may be established, for example, via the switch/media gateway 112 or the multimedia/social media server 154. In one embodiment, the user device may include several user devices used in conjunction. For example, a customer may be sitting at a computer with a webcam and web accessibility, and may also have a mobile device accessible to him for sending text messages. The primary resource services the interaction via the selected media channel or media channels.

If the routing server 124 determines that the primary resource is not available or is not present at a suitable place, the routing server 124 identifies (or selects) a secondary resource (or second resource) for handling the interaction. Resources that were filtered out at operation 466 may be secondary resources. According to an embodiment, the secondary resource, unlike the primary resource, is not assigned an attribute indicative of being suitable for handling interactions with individuals having the physical impairment. For example, the secondary resource may be an agent who is not tagged with an HII skill but whose presence information indicates that he has access to an HII-appropriate media channel (e.g., chat) that is also supported by the user's device.

At operation 472, the routing server 124 transmits a signal for routing the interaction to the secondary resource. In response to the signal, a communication session is established between a device of the secondary resource and a user device of the individual having the physical impairment. The communication session may be established, for example, via the switch/media gateway 112 or the multimedia/social media server 154.

At operation 474, the routing server 124 checks whether the interaction is still ongoing. If so, at operation 476 the routing server 124 continues to monitor availability of the primary resource. That is, while the interaction is still being serviced by the secondary resource, the routing server 124 may receive updated availability information indicating that the primary resource has become or is likely to become available while the interaction is still being serviced by the secondary resource.

At operation 476, if the primary resource is not available, the routing server 124 returns to operation 474 and continues to monitor availability of the primary resource until the interaction is no longer ongoing.

At operation 477, if the primary resource is currently available or is likely to become available while the interaction is being serviced by the secondary resource, the routing server 124 checks to see whether the primary resource is currently or is likely to be (e.g., within a threshold wait time) present at a place suitable for servicing individuals with the particular physical impairment. If the primary resource is not present or is not likely to become present at such a place, the routing server 124 returns to operation 474 and continues to monitor availability and/or presence of the primary resource until the interaction is no longer ongoing.

At operation 478, in response to determining that the primary resource is or is likely to become available while the interaction is still ongoing, and that the primary resource is or is likely to be present at a suitable place, the routing server 124 transmits a signal for transferring the communication session to a device of the primary resource. In one embodiment, where the interaction is being serviced via video chat, the routing server 124 may also transmit a signal for transferring a recording of the video chat to the primary resource.

The routing server 124 may also notify the secondary resource and/or the customer of the updated availability of the primary resource prior to transferring the interaction to the primary resource for further servicing. Instead of a transfer, the routing server may add the primary resource to the existing communication session between the secondary resource and the end user.

In another embodiment, upon receiving an indication that the primary resource is now available or is likely to become available, the routing server 124 reserves the primary resource to ensure that the primary resource is available to handle the interaction, and transmits a signal for routing the interaction to the primary resource for servicing.

According to embodiment, after the interaction has concluded, the system may perform further analysis of the interaction. For example, the interaction may be recorded, e.g., by a recording server, while being serviced. Recordation may involve generating a text transcript, an audio recording, a video recording, screenshot captures, and the like. Both sides of the interaction (i.e., customer side and contact center side) may be recorded. The real-time generated transcript may be used in the case of transfer to another contact center resource, or in the case of conferencing. According to an embodiment, the recording is tagged with an attribute indicative of or relating to the physical impairment of the customer (e.g., "HII" or "sign language"), and saved. The recordings may be analyzed in real-time for purposes such as supervisor silent monitoring, whisper coaching, or barge-in, or analyzed post-processing for purposes such as performance analytics, flagging follow-up, compliance checks, and training. In one embodiment, the statistics server 132 interacts with the reporting server 134 to analyze the recorded material. The recorded materials may be stored, for example, in the UCS 127 or the mass storage device 126.

Figure 5:
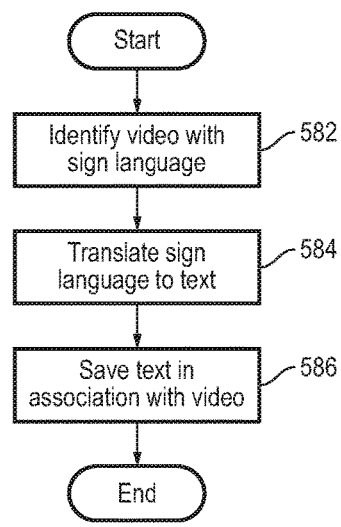
FIG. 5 is a flow diagram of a method for processing a video interaction according to an embodiment of the present invention.

FIG. 5 is a flow diagram of a method for processing a video interaction according to an embodiment of the present invention.

At operation 582, the reporting server 134 identifies a video interaction with sign language. For example, the reporting server may identify a video interaction recording tagged with the "sign language" attribute. At operation 584, the reporting server 134 invokes a sign language recognition and translation to text program, to translate the sign language in the video recording to text. At operation 586, the reporting server 134 saves the text translation in association with the video recording.

According to one embodiment, video interactions and recordings may be analyzed utilizing emotion detection, lip reading, translation of sign language to text, and the like. In the case of emotion detection, features such as the pace of signing, the trajectory of the user's hands, and facial recognition, may be assessed.

According to one embodiment, the routing server 124 may integrate a follow-up or callback at various points of interaction processing. For example, referring to operation 476 in FIG. 4B, the routing server 124 may suspend an interaction (e.g., by hanging up the call) and initiate a follow-up communication to the end user after it has reserved an appropriate resource. The routing server 124 may also automatically initiate a follow-up communication to a customer after an interaction is completed. The follow-up communication may be transmitted to the customer via the virtual media channel (e.g., HII channel), and may contain a link for resuming the interaction.

In some embodiments, while the secondary resource is handling the interaction, the routing server 124 may determine, based on a resource's skill profile and/or place profile, that the resource needs further assistance in handling the interaction. For example, the routing server 124 may access an agent's profile and determine that the agent does not have the appropriate knowledge of sign language to assist an HII user. As another example, the routing server 124 may access presence information of an agent and determine (e.g., by accessing an associated place profile) that the agent is at a place that does not have video chat capability.

Accordingly, in one embodiment, the routing server 124 may invoke another resource (a third resource) to assist the secondary resource with servicing the interaction. The third resource may be assigned an attribute indicative of being suitable for assisting with interactions with individuals having the physical impairment. The third resource may provide additional functionality related to the particular physical impairment of the customer. For example, a video call interaction with an HII user who knows sign language may be routed to a secondary resource such as an agent who is not associated with the HII attribute (e.g., does not know sign language). The routing server 124 may identify and invoke a third resource, such as a sign language recognition and translation to text program, to assist the agent in servicing the interaction by translating the customer's sign language to text that the agent can read. In one embodiment, the third resource may include an avatar that can sign the agent's responses back to the customer.

A third resource may also be invoked to assist resources that are already associated with the appropriate skill. For example, an HII customer may only be able to sign in Chinese Sign Language while the agent (e.g., a primary resource who is assigned the HII attribute) may only be able to sign in American Sign Language. The third resource may be an automated avatar that can be used in conjunction with active sign recognition and translation to text. For example, the customer's Chinese Sign Language could be recognized and translated to text in real time for the agent to read, and the agent's response (e.g., entered as text or by signing in American Sign Language) could be conveyed to the end user in Chinese Sign Language by the avatar.

As another example, an agent may be able to sign in the same version of sign language as an HII customer, but the agent may not be present at an HII place enabled with a webcam for video chat. The routing server 124 may invoke an automatic sign language recognition and translation to text program, to assist the agent in servicing the interaction by translating the customer's sign language to text that the agent can read.

In one embodiment, an HII customer may be one of a plurality of participants on a conference call. The other participants may include a mixed population of agents with different skills. The routing server 124 interacts with the mass storage device 126 to access the agent profiles of the agents, and the routing server 124 may determine, based on the agent profiles, that some of the agents are not assigned with a sign language skill. The routing server 124 may invoke a third resource, a sign recognition and translation program, to translate the HII customer's signing to text on the fly, and may distribute the text translation to the other participants on the call. The text may be distributed to all other participants on the call, or to only those participants whom the routing server 124 has determined do not understand sign language.

Certain actions may automatically trigger particular resources or treatments. In one embodiment involving an interaction with an HII customer that is being serviced over a video chat channel, when the interaction is transferred to a resource who is not located in a place enabled with video chat, or who does not understand sign language, the transfer may automatically trigger automatic recognition and translation of the HII customer's signing to text on the fly. The text is transmitted to the resource for servicing of the interaction.

According to an embodiment, the routing server 124 may also modify (e.g., open or close) or unbundle (or deconstruct) a bundle of media channels. As one example, a first resource located at a first place may service an interaction with an HII customer via the HII channel 248, which may include a video channel, an audio channel, a chat channel, and a text channel. The interaction may then be transferred to a second resource located at a second place for further handling. Prior to transmitting a signal to route the interaction to the second resource at the second place, the routing server 124 may interact with the mass storage device 126 to access the place profile of the second place. By comparing the place profile of the first place with the place profile of the second place, the routing server 124 may determine that the second place has different capabilities than the first place. For example, the second place may not have text capabilities. As such, in one embodiment the routing server 124 transmits a signal, via the call controller 118 or multimedia server 154, to close the text channel. The customer may receive a notification (e.g., before or after the interaction is transferred to the second resource) that the text media channel is no longer available. The notification may also specify which media channels are or will be available for interacting with the second resource (e.g., the video channel, the audio channel, and the chat channel). According to one embodiment, the negotiation between the customer and the second resource of the specifics relating to the media channels to be used is done via SDP.

As another example, the routing server 124 may unbundle the sub-channels of the virtual media channel. For instance, in the scenario described above, the routing server 124 may unbundle the HII channel 248 such that the text channel remains with the first resource and/or the first place, and the other channels (e.g., the video channel, the audio channel, and the chat channel) are transferred to the second resource and/or to the second place.

The routing server 124 may also modify a bundle of channels, for example by opening (or adding) a sub-channel or by switching out one sub-channel for another. For instance, the second resource may be present at a place that has a capability that the first place does not have. For example, the first place may have a video channel but not a text channel capability, and the second place may have a text channel capability but not a video channel capability. In that case, prior to transmitting a signal to transfer the interaction to the second resource for servicing via the second place, the routing server 124 may modify the virtual media channel to close (or remove) the video channel and open (or add) the text channel. The customer may receive a notification (e.g., before or after the interaction is transferred to the second resource) that the video media channel is no longer available but that the text media channel is now available.

According to one embodiment, an inter-session SDP can be used to modify or close a sub-channel.

A system and method for handling interactions with individuals having physical impairments according to an embodiment of the present invention will be described in further detail with reference to the following example user story.

John is partially deaf and finds it difficult to hear other people on phone calls. John is at the airport and has just missed his flight to Portland. Air GetYaThere has another flight to Portland in less than one hour. John wants to know if he can get on that flight, but there is no one at the desk and he does not want to go out of security to ticketing and risk not being back in time for the next flight. John has a smart phone. On his smart phone is a TTY application that can interact with the phone and interpret TTY signals.

John first uses his web browser to navigate to Air GetYaThere's company website, airgetyathere.com. On the website he finds a phone number for customer service. He looks for an alternative number for TTY users, but cannot find one. He is concerned about how this will work but he is not sure what to do next. John calls the customer service number.

The call is picked up by a voice response system. The voice response system delivers an initial audio message that states, "If hearing impaired, press 1." For example, the call controller 118 in FIG. 1 may run a voice application programmed with Voice eXtensible Markup Language (VXML) that causes an audio file to play the message as soon as the call is picked up. The audio file may include embedded TTY tones that trigger TTY rendering on John's mobile application. The TTY tones may add further details to the displayed message. For example, when the audio file is run, John's smart phone may display the following text: "For enhanced experience for hearing impaired users with TTY, press 1 on your phone set." John is pleased and presses 1.

John's selection triggers the voice response system to execute an alternative voice application (e.g., another VXML application) with the same options as the main voice application. The audio files run by the alternative voice application have embedded TTY tones that can present messages as text on John's smart phone application. After interacting with the voice application for a few minutes, John cannot find a menu option that easily resolves his issue, so he feels he needs further assistance. John presses 0 to request a customer service representative. Before terminating, the alternative voice application asks John about his device's capabilities. For example, the voice application may ask, "do you have access to a web browser?" to which John may respond in the affirmative. The voice application could also ask other questions about device capability, such as, "are you on a mobile device?" or "can you receive text messages?"

The alternative voice application ends and information about John's responses to the voice response system may be transmitted to the call controller 118 and stored in the UCS 127 and the mass storage device 126. Based on this information, the call controller 118 determines that John has a hearing impairment. The routing server 124 executes a routing application (e.g., an SCXML application) that selects a virtual media channel associated with the "HII" attribute. The virtual media channel may bundle HII-suitable (or compatible) media channels such as chat, video, and email. The routing application may also identify as a primary resource an agent having an agent profile that includes the "HII" skill.

The routing server 124 may also interact with the UCS 127 and the mass storage device 126 to retrieve additional data about John, including John's email address. While preparing to identify an appropriate resource for servicing the call, the routing application may run an audio file embedded with TTY, which states: "We have your email address on record. As soon as a customer service representative is available we will email you. Is this okay?" John indicates that it is, and the routing server 124 suspends the interaction by hanging up the call.

The routing application executed by the routing server 124 utilizes skills-based routing to identify agents (or customer service representatives (CSRs)) associated with the "HII" skill, but none are currently available. After three minutes, which is the threshold wait time designated by the routing application, the routing application does not want to keep John waiting. The routing application identifies and reserves a secondary resource who is a CSR whose presence information indicates that he is present at an HII place enabled with the chat channel and that he is currently available. The routing application initiates an outbound follow-up email to John containing a web browser link to a page with chat capability, so that John can resume the interaction.

John clicks on link and is presented with a web page that says, "Welcome, John." The web page contains a chat widget that is already associated with the reserved CSR. A recording server begins recording the interaction. John enters text into the chat widget that states, "I missed flight 123 and wonder if I can get onto flight 789?" Unfortunately, flight 789 is full. The CSR and John spend several minutes working together to find alternate flight accommodations. The CSR sends chat links (e.g., website links sent via the chat widget) to John for various flight option web pages and also utilizes screen sharing to co-browse web pages with other options. They go back and forth but most of the flights do not have a window seat as John prefers. Being on a smart phone, John's thumbs start to get tired.

Meanwhile, the routing application has continued to monitor for availability of a CSR associated with the "HII" skill. One has now become available. The routing application reserves this new CSR and initiates a notification to the original CSR assisting John that help is available. The routing application provides the original CSR with a link to a video session with the new CSR.

The original CSR offers to bring in the new CSR, who is a hearing impaired specialist. John accepts. The original CSR sends the video call session link to John via the chat channel. John clicks the link and is entered into a three-way videoconference with the original CSR and the new CSR. The original CSR briefs the new CSR on what has already been discussed, and disconnects from the interaction. For example, the original CSR may brief the new CSR by sending a transcript of the original video call session to the new CSR. The HII CSR now interacts with John in the videoconference using sign language. This is much easier for John. They work out an agreement on an alternate flight and end the interaction.

After the interaction has ended, the routing application automatically initiates a follow-up (e.g., a callback) to John via one of the channels bundled in the associated virtual media channel. John answers the call and a voice application plays a menu which uses TTY audio recordings to survey John on his experience. John is delighted and gives very positive feedback.

In one embodiment, each of the various servers, controllers, switches, gateways, engines, and/or modules (collectively referred to as servers) in the afore-described figures are implemented via hardware or firmware (e.g., ASIC) as will be appreciated by a person of skill in the art.

In one embodiment, each of the various servers, controllers, switches, gateways, engines, and/or modules (collectively referred to as servers) in the afore-described figures is a process or thread, running on one or more processors, in one or more computing devices 1500 (e.g., FIG. 6A, FIG. 6B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the Internet using various protocols, such as by exchanging data encoded in extensible markup language (XML) or JavaScript Object notation (JSON).

Figure 6A:
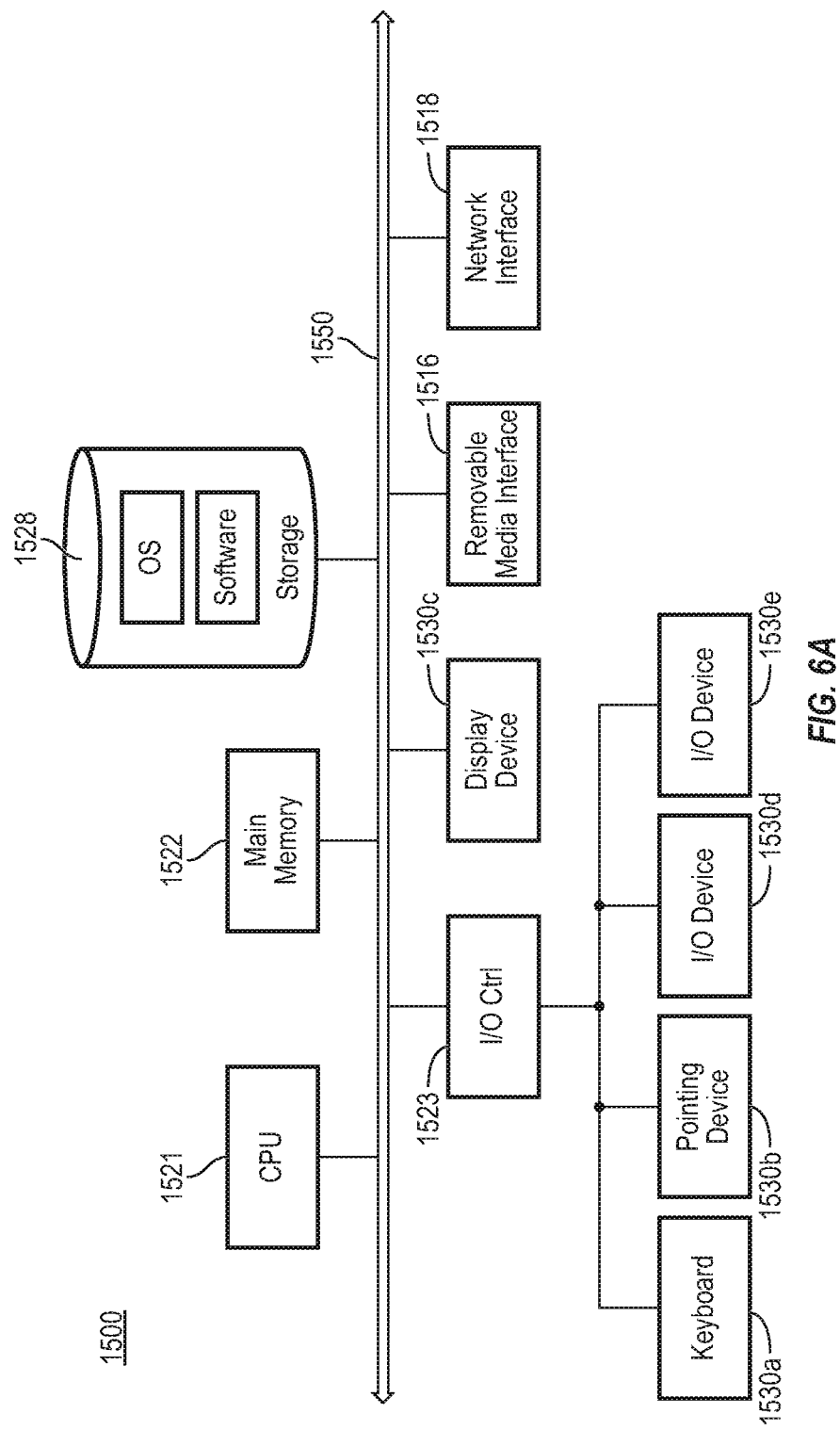
FIG. 6A is a block diagram of a computing device according to an embodiment of the present invention.
Figure 6B:
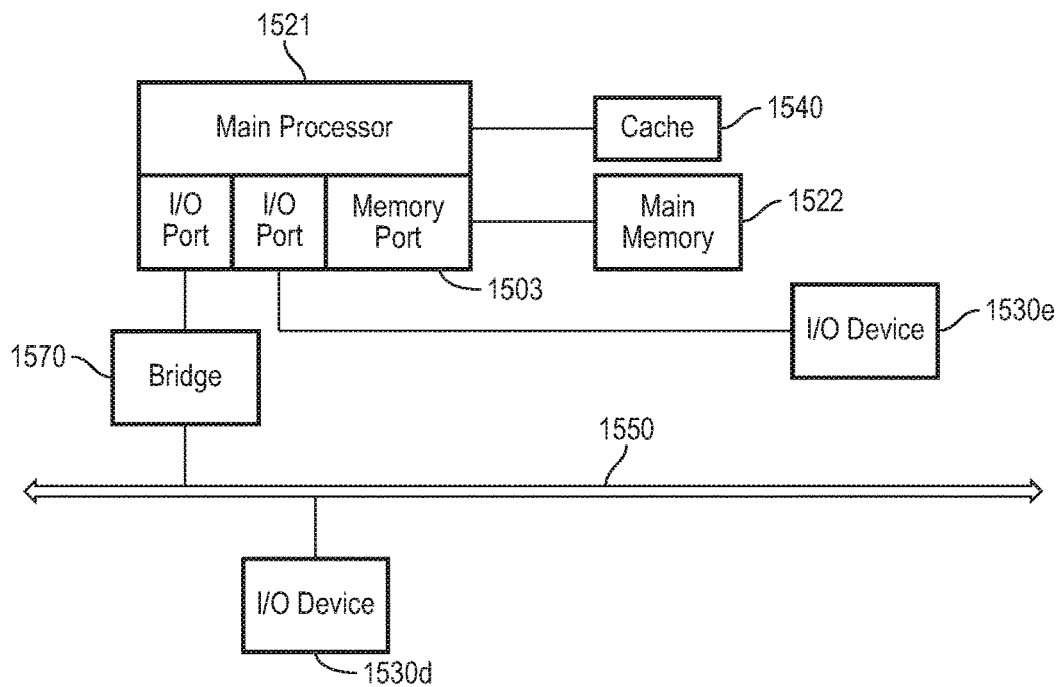
FIG. 6B is a block diagram of a computing device according to an embodiment of the present invention.

FIG. 6A and FIG. 6B depict block diagrams of a computing device 1500 as may be employed in exemplary embodiments of the present invention. Each computing device 1500 includes a central processing unit 1521 and a main memory unit 1522. As shown in FIG. 6A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 6B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 6A, the central processing unit 1521 communicates with the main memory 1522 via a system bus 1550. As shown in FIG. 6B, the central processing unit 1521 may also communicate directly with the main memory 1522 via a memory port 1503.

FIG. 6B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 6A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 6B depicts an embodiment of a computer 1500 in which the central processing unit 1521 communicates directly with I/O device 1530e. FIG. 6B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 6A, may control the I/O devices. The I/O controller may control one or more I/O devices such as a keyboard 1530a and a pointing device 1530b, e.g., a mouse or optical pen.

Referring again to FIG. 6A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530*c*, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 6A and FIG. 6B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 6C:
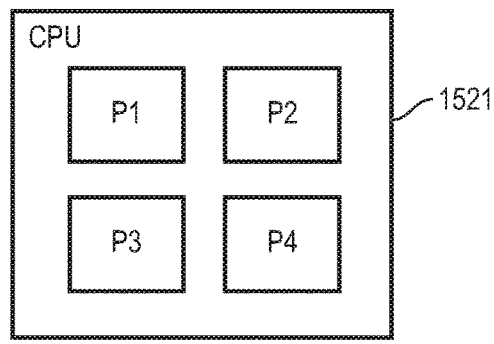
FIG. 6C is a block diagram of a computing device according to an embodiment of the present invention.
Figure 6D:
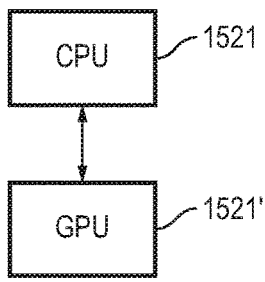
FIG. 6D is a block diagram of a computing device according to an embodiment of the present invention.

As shown in FIG. 6C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 6D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 6E:
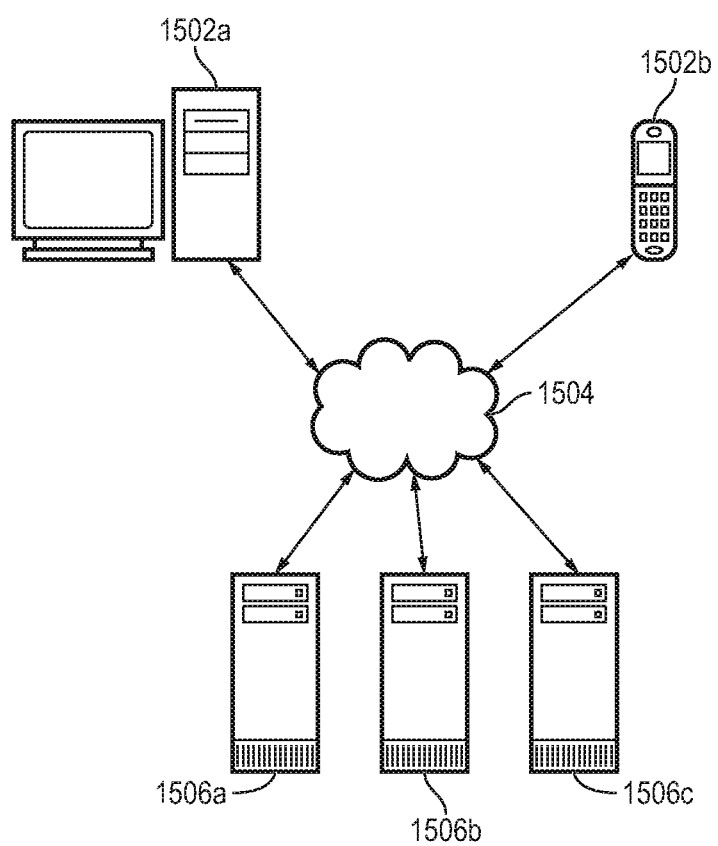
FIG. 6E is a block diagram of a network environment including several computing devices according to an embodiment of the present invention.

A computing device may be one of a plurality of machines connected by a network, or it may comprise a plurality of machines so connected. FIG. 6E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 6E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 6E may be a virtual network environment where the various components of the network are virtualized. For example, the various machines 1502 may be virtual machines implemented as a software-based computer running on a physical machine. The virtual machines may share the same operating system. In other embodiments, different operating systems may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization are also contemplated, such as, for example, the network (e.g. via Software Defined Networking (SDN)). Functions, such as functions of the session border controller and other types of functions, may also be virtualized, such as, for example, via Network Functions Virtualization (NFV).

In addition, the various processes described herein may be described in terms of software routines executed by the processor in the server 100 based on instructions stored in the server's memory. The instructions may also be stored in other non-transient computer readable media such as, for example, a CD-ROM, flash drive, or the like. A person of skill in the art should also recognize that the routine may be executed via hardware, firmware (e.g. via an ASIC), or in any combination of software, firmware, and/or hardware. Furthermore, the sequence of steps of the process is not fixed, but can be altered into any desired sequence as recognized by a person of skill in the art.

Although in the above description interactions are described as being initiated by the end user, embodiments of the present invention are not limited thereto and the interactions may be initiated on the contact center side.

What is claimed is:

1. A method for handling an interaction between an individual having a physical impairment and a customer contact center, the method comprising:
    detecting, by a processor, an interaction directed to a route point, wherein the route point is associated with a call number, wherein the call number is not a dedicated number for interactions with hearing or speech impaired individuals;
    determining, by the processor, that the interaction is associated with an individual having a physical impairment;
    determining, by the processor, that the interaction should be handled by a resource having a first attribute, and at a place having a second attribute different from the first attribute, wherein the first and second attributes are correlated to the physical impairment of the individual;
    identifying, by the processor, a first resource of the contact center for handling the interaction, wherein the identifying is based on the first attribute being assigned to the first resource;
    determining, by the processor, whether the first resource is at a place assigned with the second attribute; and
    transmitting a signal, by the processor, based on the determining that the first resource is at the place, the signal being for routing the interaction to the first resource for servicing via the place, wherein in response to the signal, a communication session is established with a user device of the individual having the physical impairment.

2. The method of claim 1, wherein the determining as to whether the interaction is associated with an individual having the physical impairment is based on data transmitted by the user device of the individual having the physical impairment.

3. The method of claim 1, wherein the determining that the interaction is associated with an individual having the physical impairment is based on a response to a prompt provided by an interactive media response server coupled to the processor.

4. The method of claim 1, wherein the determining that the interaction is associated with an individual having the physical impairment is based on a user attribute stored in a mass storage device coupled to the processor.

5. The method of claim 1, wherein the first resource is an agent of the contact center, and the first attribute is stored as an agent skill.

6. The method of claim 1, wherein the place is enabled to handle interactions via a plurality of media channels bundled as a virtual media channel.

7. The method of claim 6, wherein the plurality of media channels are preset prior to the interaction.

8. The method of claim 6, wherein the plurality of media channels are dynamically aggregated and associated with the place, in response to detecting the interaction, and based on at least one of a profile of the individual having the physical impairment or capabilities of the user device.

9. The method of claim 1, further comprising:
    selecting, by the processor, a second resource based on determining that the first resource is not present at the place, wherein the first attribute is not assigned to the second resource;
    transmitting, by the processor, a signal for routing the interaction to the second resource, wherein in response to the signal, a communication session is established with the user device of the individual having the physical impairment;
    monitoring availability of the first resource during the communication session; and
    in response to determining availability of the first resource during the communication session, transmitting a signal for transferring the communication session to a device of the first resource.

10. The method of claim 1, wherein the physical impairment is at least one of impaired speech, impaired hearing, impaired mobility, or impaired vision.

11. A system for handling an interaction between an individual having a physical impairment and a customer contact center, the system comprising:
    a processor; and
    a memory, wherein the memory stores instructions that, when executed by the processor, cause the processor to:
        detect an interaction directed to a route point, wherein the route point is associated with a call number, wherein the call number is not a dedicated number for interactions with hearing or speech impaired individuals;
        determine that the interaction is associated with an individual having a physical impairment;
        determine that the interaction should be handled by a resource having a first attribute and at a place having a second attribute different from the first attribute, wherein the first and second attributes are correlated to the physical impairment of the individual;
        identify a first resource of the contact center for handling the interaction, wherein the identifying is based on the first attribute being assigned to the first resource;

determine whether the first resource is at a place assigned with the second attribute; and transmit a signal based on the determining that the first resource is at the place, the signal being for routing the interaction to the first resource for servicing via the place, wherein in response to the signal, a communication session is established with a user device of the individual having the physical impairment.

12. The system of claim 11, wherein the instructions that cause the processor to determine that the interaction is associated with an individual having the physical impairment comprise instructions for making the determination based on data transmitted by the user device of the individual having the physical impairment.

13. The system of claim 11, wherein the instructions that cause the processor to determine that the interaction is associated with an individual having the physical impairment comprise instructions for making the determination based on a response to a prompt provided by an interactive media response server coupled to the processor.

14. The system of claim 11, wherein the instructions that cause the processor to determine whether the interaction is associated with an individual having the physical impairment comprise instructions for making the determination based on a user attribute stored in a mass storage device coupled to the processor.

15. The system of claim 11, wherein the first resource is an agent of the contact center, and the first attribute is stored as an agent skill.

16. The system of claim 11, wherein the place is enabled to handle interactions via a plurality of media channels bundled as a virtual media channel.

17. The system of claim 16, wherein the plurality of media channels are preset prior to the interaction.

18. The system of claim 16, wherein the plurality of media channels are dynamically aggregated and associated with the place, in response to detecting the interaction, and based on at least one of a profile of the individual having the physical impairment or capabilities of the user device.

19. The system of claim 11, wherein the instructions, when executed, further cause the processor to:

select a second resource based on determining that the first resource is not present at the place, wherein the first attribute is not assigned to the second resource;

transmit a signal for routing the interaction to the second resource, wherein in response to the signal, a communication session is established with the user device of the individual having the physical impairment;

monitor availability of the first resource during the communication session; and in response to determining availability of the first resource during the communication session, transmit a signal for transferring the communication session to a device of the first resource.

20. The system of claim 11, wherein the physical impairment is at least one of impaired speech, impaired hearing, impaired mobility, or impaired vision.

* * * * *